(12) United States Patent
Dettinger et al.

(10) Patent No.: US 8,239,400 B2
(45) Date of Patent: *Aug. 7, 2012

(54) ANNOTATION OF QUERY COMPONENTS (75) Inventors: Richard D. Dettinger, Rochester, MN (US); Cale T. Rath, Byron, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 1316 days.

This patent is subject to a terminal disclaimer.

(21) Appl. No.: 10/645,123

(22) Filed: Aug. 21, 2003

(65) Prior Publication Data

US 2005/0044098 A1 Feb. 24, 2005

(51) Int. Cl.
*G06F 17/30* (2006.01)
(52) U.S. Cl. ........................ 707/765; 707/713
(58) Field of Classification Search .......... 707/765
See application file for complete search history.

(56) References Cited

U.S. PATENT DOCUMENTS

| | | | |
|---|---|---|---|
| 5,999,182 A | 12/1999 | Etchemendy et al. | |
| 6,484,156 B1 | 11/2002 | Gupta et al. | |
| 6,519,603 B1* | 2/2003 | Bays et al. | 707/102 |
| 6,571,199 B1* | 5/2003 | Floratos et al. | 702/179 |
| 6,571,295 B1 | 5/2003 | Sidana | |
| 6,687,878 B1 | 2/2004 | Eintracht et al. | |
| 6,725,227 B1 | 4/2004 | Li | |
| 6,871,318 B1 | 3/2005 | Wynblatt et al. | |
| 6,954,748 B2* | 10/2005 | Dettinger et al. | 707/774 |
| 6,956,593 B1* | 10/2005 | Gupta et al. | 715/751 |
| 6,996,558 B2* | 2/2006 | Dettinger et al. | 707/774 |
| 7,392,267 B2 | 6/2008 | Cragun et al. | |
| 7,668,798 B2* | 2/2010 | Scanlon et al. | 707/100 |
| 7,752,197 B2 | 7/2010 | Dettinger et al. | |
| 7,844,607 B2 | 11/2010 | Dettinger et al. | |
| 7,849,074 B2 | 12/2010 | Dettinger et al. | |
| 7,860,877 B2* | 12/2010 | Petropoulos et al. | 707/759 |
| 2003/0196164 A1 | 10/2003 | Gupta et al. | |
| 2004/0138946 A1 | 7/2004 | Stolze | |
| 2004/0150669 A1 | 8/2004 | Sabiers et al. | |
| 2004/0163042 A1 | 8/2004 | Altman | |
| 2004/0205545 A1 | 10/2004 | Bargeron et al. | |
| 2004/0260702 A1* | 12/2004 | Cragun et al. | 707/100 |
| 2004/0260714 A1* | 12/2004 | Chatterjee et al. | 707/101 |

OTHER PUBLICATIONS

Dettinger et al., IBM U.S. Appl. No. 10/083,075, filed Feb. 26, 2002, "Application Portability and Extensibility Through Database Schema and Query Abstraction".

Dettinger et al., IBM U.S. Appl. No. 10/264,188, filed Oct. 3, 2002, "SQL Query Construction Using Durable Query Components".

Chatterjee et al., IBM U.S. Appl. No. 10/600,014, filed Jun. 20, 2003, "Universal Annotation Management System".

Electrical Schematics Page, Apr. 25, 2002, <http://www.jlab.org/accel/inj_group/elec1.htm>.

(Continued)

*Primary Examiner* — Charles Rones
*Assistant Examiner* — Mellissa M Chojnacki
(74) *Attorney, Agent, or Firm* — Patterson & Sheridan, LLP (57) ABSTRACT

Methods, systems, and articles of manufacture that may be used to create and share annotations for query components, such as query conditions, in an effort to share domain knowledge, are provided. The annotations may be created by users with particular domain knowledge and may contain information useful to other users when building queries including the annotated query components. A annotation may indicate a particular format or syntax for an associated query component. In some cases, a replacement to the associated query component is suggested.

23 Claims, 10 Drawing Sheets

OTHER PUBLICATIONS

Barghouti, Naser et al., Improvise - a process modeling interface with multimedia graph diagrams, Electronic Proceedings of the ACM Workshop on Effective Abstractions in Multimedia: Layout, Presentation, and Interaction, Oct. 9, 1995, ACM, New York, New York, United States, <http://www.cs.uic.edu/~ifc/mmwsproc/north/node1.html>.

* cited by examiner

ANNOTATION OF QUERY COMPONENTS

CROSS-REFERENCE TO RELATED APPLICATIONS

The present invention is related to the commonly owned, co-pending U.S. patent application Ser. No. 10/083,075, entitled "Application Portability And Extensibility Through Database Schema And Query Abstraction," filed Feb. 26, 2002, Ser. No. 10/264,188, entitled "SQL Query Construction Using Durable Query Components," filed Oct. 3, 2002, and Ser. No. 10/600,014, entitled "Universal Annotation Management System," filed Jun. 20, 2003.

BACKGROUND OF THE INVENTION

1. Field of the Invention

The present invention relates to the field of data entry and retrieval and, more particularly, to a method and system for annotating query components, such as query conditions, in an effort to share domain knowledge and facilitate building queries that retrieve desired data.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Generally speaking, queries take the form of a command language that let programmers and programs perform variety of operations on data, such as select, insert, update, find out the location of data, and so forth.

One problem facing programmers (or more generally any user building a query) is that databases tend to grow relatively brittle (inflexible) over time, which may increase the difficulties in crafting queries that retrieve a complete set of desired results. In other words, as business enterprise insert their own data, change data structures or formats, add features, and attempt to retire applications that once used the data or support older "legacy" applications, data may exist in the system in more than one format. For example, names may be entered in all capital letters sometimes (but not always), local area codes may be specified in some cases (but NULL in others), and employee IDs may be displayed in one format and stored in another format.

As a result, conventional queries rigidly adhering to a single data format may not return all the data that was desired. As an example, the following query condition:

where last_name='Smith' returns no matches if all last names are capitalized. Similarly, the following query condition:

where demographic.area_code='507' returns only partial results if some records have area codes included in telephone numbers, while others do not. Unfortunately, it may not be as apparent to a user that the query has returned only partial results as it would be if no results were returned at all. In other words, it may be very difficult to even recognize this type of problem. Finally, the following query:

where employee_id='18-203-3243' will return no results if the common format for employee IDs are stored internally without hyphens (e.g., as 182033243). Thus, users that do not realize this problem may be working with incorrect results.

On the other hand, users that do become aware of this problem may learn to craft queries designed to retrieve the data in whatever format (or combination of formats) it may exist. For example, an individual user may craft queries logically OR'ing query conditions targeting the same data, but in different formats, such as:

where last_name='Smith' OR last_name='SMITH' in an attempt to retrieve all desired data, regardless of the format. However, while this may work for the individual user, if the underlying problem is not reported and/or the potential solution shared, other users may continue to build queries that return incorrect results.

Accordingly, there is a need for a method and system for sharing knowledge regarding query construction, with the possibility of error resolution, for example via automated query modifications.

SUMMARY OF THE INVENTION

The present invention generally is directed to methods, systems, and articles of manufacture for annotating query components, for example, in an effort to share information that may facilitate building queries that retrieve desired data.

One embodiment provides method of capturing information useful in the building of queries. The method generally includes receiving an indication of a selected query component, providing an interface allowing a user to create an annotation to associate with the selected query component, and storing the annotation with a reference to the selected query component.

Another embodiment provides a method of sharing information useful in the building of queries. The method generally includes monitoring one or more query components specified for use in a query, searching for annotations associated with the one or more query components, and providing an indication of one or more annotations, if found, associated with the one or more query components.

Another embodiment provides a computer-readable medium containing a program for annotating query components. When executed by a processor, the program performs operations generally including receiving an indication of one or more selected query component, providing an interface allowing a user to create an annotation to associate with the selected query component, and storing the annotation with a reference to the selected query component.

Another embodiment provides a system for sharing information useful in building queries. The system generally includes an annotation database for storing annotations, a query building interface allowing users to build queries by specifying query components, and an annotation system allowing users to create and display annotations associated with query components used in building queries.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides methods, systems, and articles of manufacture that may be used to create and share annotations for query components, such as query conditions, in an effort to share domain knowledge. The annotations may be created by users with particular domain knowledge and may contain information useful to other users when building queries including the annotated query components. As an example, an annotation may indicate a particular format or syntax an associated query component should take. For some embodiments, a replacement to the associated query component may also be suggested.

As used herein, the term query component generally refers to any identifiable portion of a query, such as a query condition, a group of conditions, a particular value used in a query condition, specified query results, formatting thereof, as well as an entire query. As used herein, the term annotation generally refers to any type of descriptive information and may exist in various forms, including textual annotations (descriptions, revisions, clarifications, comments, instructions, etc.), graphical annotations (pictures, symbols, etc.), sound clips, etc. While an annotation may exist in any or all of these forms, to facilitate understanding, embodiments of the present invention may be described below with reference to textual annotations as a particular, but not limiting, example of an annotation.

Further, as used herein, the term user may generally apply to any entity utilizing the annotation system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

In one embodiment of the present invention, a data model may be implemented as a data repository abstraction component containing a collection of abstract representations of physical fields of a searchable database (hereinafter "logical fields"). Thus, this data abstraction model provides a logical view of the underlying database, allowing the user to generate "abstract" queries against the data warehouse without requiring direct knowledge of its underlying physical properties. A runtime component (e.g., a query execution component) performs translation of abstract queries (generated based on the data abstraction model) into a form that can be used against a particular physical data representation.

While the data abstraction model is generally designed to facilitate query building by insulating the user from many details of the underlying data (particular formatting, organization, etc.), there may still be situations where domain knowledge of the underlying data may be useful for generating queries. Thus, capturing and sharing such domain knowledge as annotations for query components, as described herein, may be useful even when working with a data abstraction model.

The concepts of data abstraction and abstract queries are described in detail in the commonly owned, co-pending application Ser. No. 10/083,075, entitled "Improved Application Portability And Extensibility Through Database Schema And Query Abstraction," filed Feb. 26, 2002, herein incorporated by reference in its entirety. While the data abstraction model described herein provides one or more embodiments of the invention, persons skilled in the art will recognize that the concepts provided herein can be implemented without such a data abstraction model while still providing the same or similar results.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature

An Exemplary Environment

Figure 1:
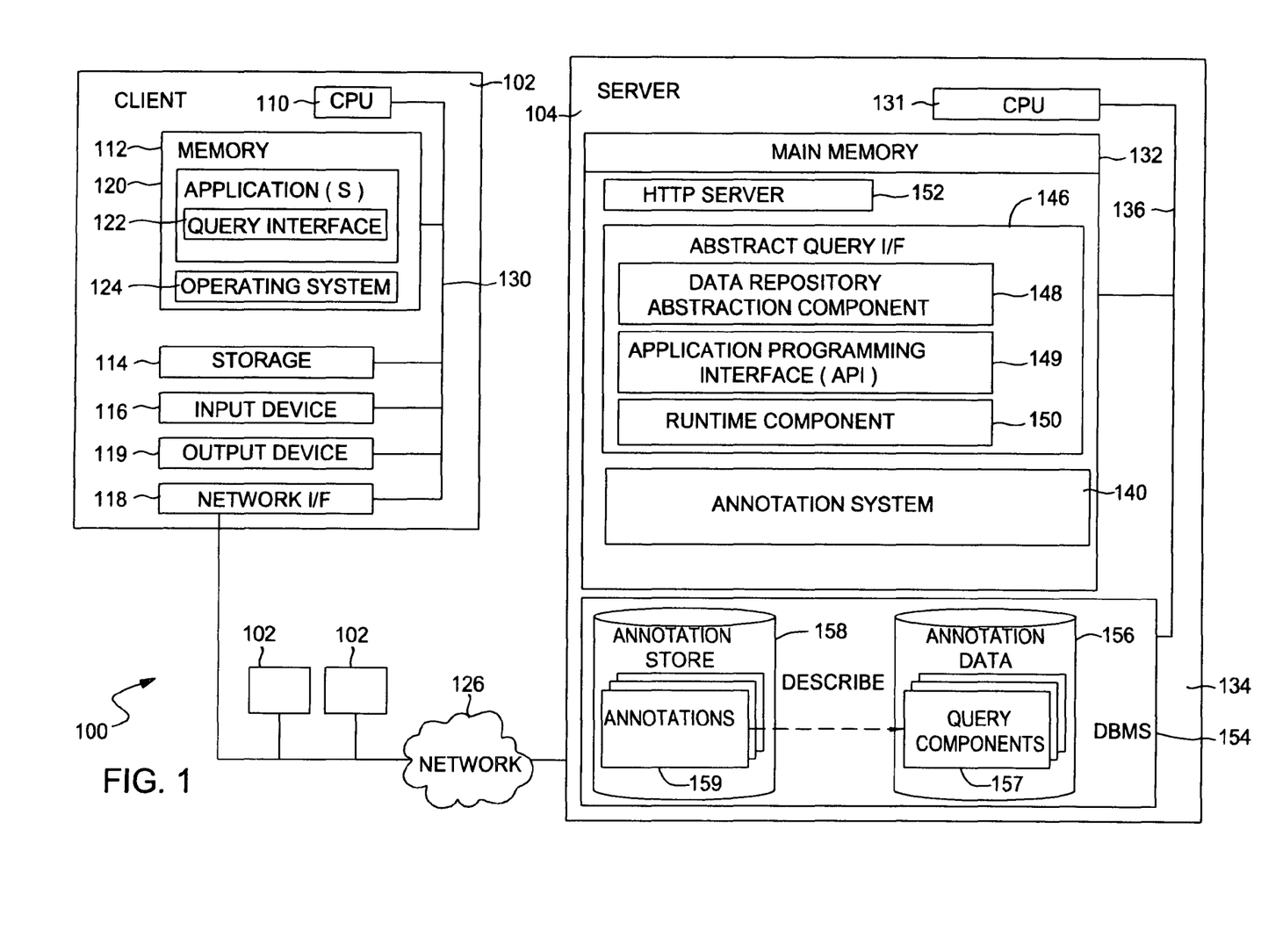
FIG. 1 is an exemplary computing environment in which embodiments of the present invention may be utilized.

FIG. 1 shows an exemplary networked computer system 100, in which embodiments of the present invention may be utilized. For example, embodiments of the present invention may be implemented as a program product for use with the system 100 (e.g., as part of a query building interface 122, query execution runtime component 150, and/or annotation system 140) to allow the capture and exchange of information useful in building queries. Queries may be generated via the query building interface 122 and may target data stored in an application data store 156. As will be described in greater detail below, annotations made, via the annotation system 140, may contain information regarding the targeted data (e.g., a particular format, organization, and content of the targeted data).

As illustrated in FIG. 1, the system 100 generally includes client computers 102 and at least one server computer 104, connected via a network 126. In general, the network 126 may be a local area network (LAN) and/or a wide area network (WAN). In a particular embodiment, the network 126 is the Internet. For other embodiments, however, the methods described herein may be performed on a single (e.g., non-networked) computer system.

As illustrated, the client computers 102 generally include a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a client 102 may include a display screen with an integrated touch-screen or a display with an integrated keyboard.

The network interface device 118 may be any entry/exit device configured to allow network communications between the client 102 and the server 104 via the network 126. For example, the network interface device 118 may be a network adapter or other network interface card (NIC). If the client 102 is a handheld device, such as a personal digital assistant (PDA), the network interface device 118 may comprise any suitable wireless interface to provide a wireless connection to the network 126.

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Examples of suitable operating systems, which may be used to advantage, include Linux and Microsoft's Windows®, as well as any operating systems designed for handheld devices, such as Palm OS®, Windows® CE, and the like. More generally, any operating system supporting the functions disclosed herein may be used.

The memory 112 is also shown containing the query building interface 122, such as a browser program, that, when executed on CPU 110, provides support for building queries based on a data repository abstraction (DRA) component 148. In one embodiment, the query interface 122 includes a web-based Graphical User Interface (GUI), which allows the user to display Hyper Text Markup Language (HTML) information. More generally, however, the query interface 122 may be any program (preferably GUI-based) capable of exposing a portion of the DRA component 148 on the client 102 for use in building queries. As will be described in greater detail below, queries built using the query interface 122 may be sent to the server 104 via the network 126 to be issued against one or more databases 156.

The server 104 may be physically arranged in a manner similar to the client computer 102. Accordingly, the server 104 is shown generally comprising a CPU 131, a memory 132, and a storage device 134, coupled to one another by a bus 136. Memory 132 may be a random access memory sufficiently large to hold the necessary programming and data structures that are located on the server 104.

The server 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used. As illustrated, the server 104 may be configured with an abstract query interface 146 for issuing abstract queries (e.g., received from the client application 120) against one or more of the databases 156.

In one embodiment, elements of a query are specified by a user through the query building interface 122 which may be implemented as a browser program presenting a set of GUI screens for building queries. The content of the GUI screens may be generated by one or more applications of the abstract query interface 146. In a particular embodiment, the GUI content is hypertext markup language (HTML) content which may be rendered on the client computer systems 102 with the query building interface 122. Accordingly, the memory 132 may include a Hypertext Transfer Protocol (http) server process 152 (e.g., a web server) adapted to service requests from the client computer 102. For example, the server process 152 may respond to requests to access the database(s) 156, which illustratively resides on the server 104. Incoming client requests for data from a database 156 invoke a server application which, when executed by the processor 130, perform operations necessary to access the database(s) 156. In one embodiment, the server application comprises a plurality of servlets configured to build GUI elements, which are then rendered by the query interface 122.

Components of the server computer 104 may be physically arranged in a manner similar to those of the client computer 102. For example, the server computer 104 is shown generally comprising a CPU 135, a memory 133, and a storage device 134, coupled to one another by a bus 136, which may all function as similar components described with reference to the client computer 102. The server computer 104 is generally under the control of an operating system (e.g., IBM OS/400®, UNIX, Microsoft Windows®, and the like).

As illustrated, the server computer 104 may be configured with the annotation system 140, also shown residing in memory 132. The annotation system 140 may be used to generate annotations 159 that, for some embodiments, may be stored in an annotation store 158 separate from the application data store 156. The annotations 159 may include a variety of annotations, for example, describing data in the application data store 156. The universal annotation system 111 may be any suitable type annotation system and, for some embodiments, may be similar to the universal annotation system described in the commonly owned, co-pending application Ser. No. 10/600,014, entitled "Universal Annotation System," filed Jun. 20, 2003, herein incorporated by reference.

In addition to creating annotations for application data, the annotation system 140 may also be used to create annotations for query components 157 (e.g., portions of queries built using the query building interface 122). As will be described in greater detail below, during a subsequent query building process, if an annotated query component 157 (or a similar query component) is selected, by a user, for use in a query, a corresponding annotation (or at least an indication, thereof) may be displayed to the user.

An Exemplary Relational View

Figure 2A:
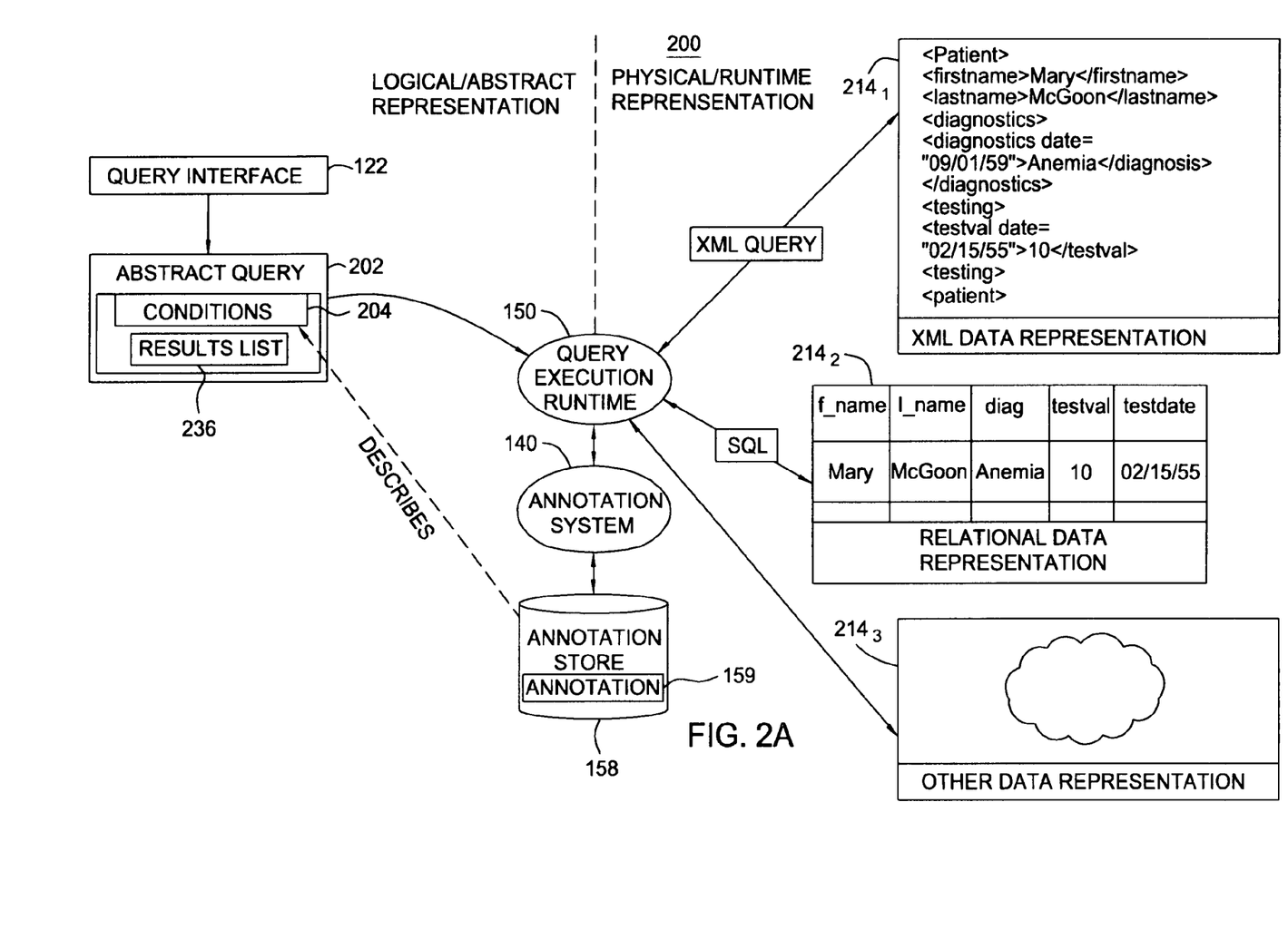
FIGS. 2A-2C illustrate relational views of software components according to one embodiment of the present invention.

Operation of various components of the system 100 may be further described with reference to FIGS. 2A-2C. FIG. 2A illustrates a relational view of the query building interface 122, query execution runtime component 150, and annotation system 140, according to one embodiment of the invention. As shown, the abstract query interface 122 may be used to generate an abstract query 202 to be issued by the query execution runtime component 150.

As illustrated, the abstract query 202 may include a set of one or more query conditions 204 and a list of query results 236, each based on logical fields defined in the DRA component 148. As previously described, the abstract query 202 may be executed by the query execution component 150. In the exemplary abstract data model, the logical fields are defined independently of the underlying data representation being used in the DBMS 154, thereby allowing queries to be formed that are loosely coupled to the underlying data representation 214.

Figure 2B:
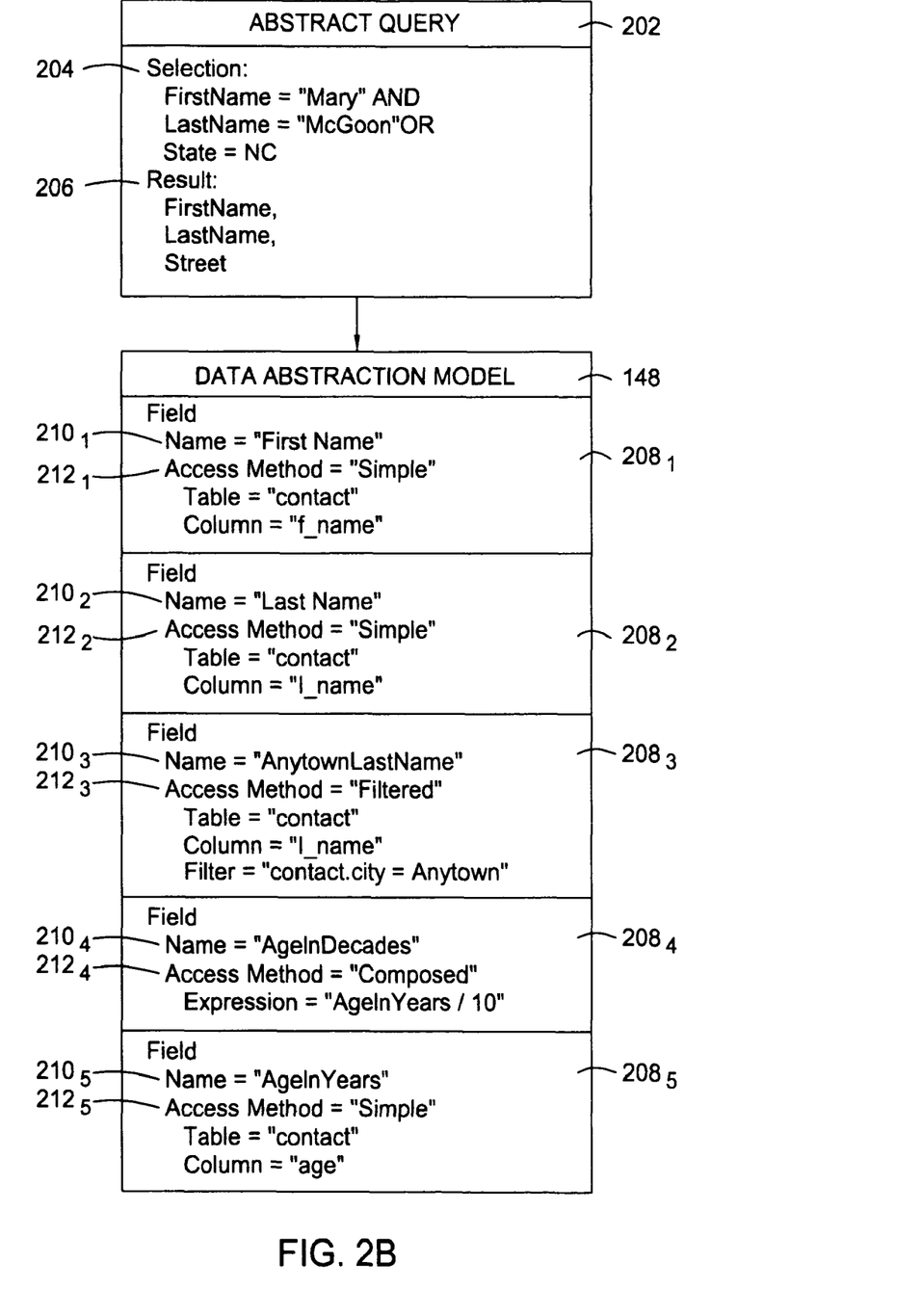

For example, as illustrated in FIG. 2B, the DRA component 148 includes a set of logical field specifications 216 that provide abstract representations of corresponding fields in a physical data representation 214 of data in the one or more databases 156 shown in FIG. 1. Each logical field specification 216 may include various information used to map the specified logical field to the corresponding physical field, such as field names, table names, and access methods (not shown) describing how to access and/or manipulate data from the corresponding physical field in the physical data representation 214. The physical data representation 214 may be an XML data representation $214_1$, a relational data representation $214_2$, or any other data representation, as illustrated by $214_N$. Therefore, regardless of the actual physical data representation 214, a user may generate an abstract query 202 based on the logical fields defined by the logical field specifications 216, in order to access data stored therein.

Referring back to FIG. 2A, the query execution component 150 is generally configured to transform the abstract query 202 into a concrete query compatible with the physical data representation (e.g., an XML query, SQL query, etc), by mapping the logical fields of the expanded abstract query 202 to the corresponding physical fields of the physical data representation 214. The mapping of abstract queries to concrete queries, by the query execution component 150, is described in detail in the previously referenced co-pending application Ser. No. 10/083,075.

As illustrated, the abstract query 202 may include one or more query components, such as a query condition 204, that may be described by an annotation 159. The annotation 159 may be created by a first user, via the annotation system 140, during a first query building session, for example, in response to gaining a particular insight into the data targeted by the query. In a subsequent query building session, a second user may build a query with the same (or a similar) query condition 204. This query session may be monitored (e.g., by a component of the query building interface 122, or annotation system 140) to detect annotated query components. In response to detecting an annotated query component (e.g., the same query condition 204), the second user may be provided with an indication that a corresponding annotation 159 exists.

Figure 2C:
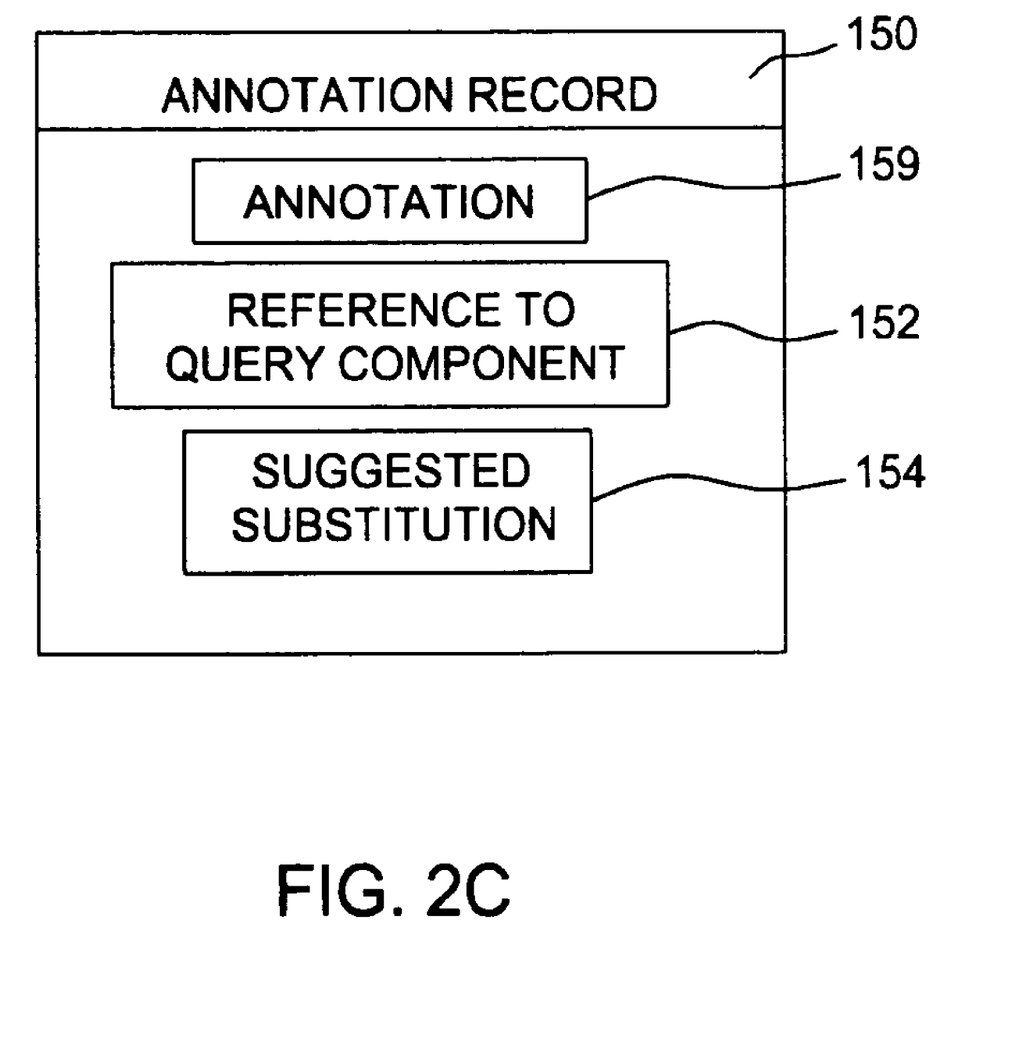

As illustrated in FIG. 2C, the annotation 159 may be stored in an annotation record 150. As shown, the annotation record 150 may include a reference 152 to the annotated query component. As will be described in greater detail below, the reference 152 may include any suitable information identifying the corresponding annotated query component and the reference 152 may vary in scope (e.g., referring to a particular query condition, or merely a field or instance value involved in a query condition). The annotation record 150 may also include a suggested modification 154, for example, designed to overcome common mistakes users make when building queries. Each of the components of the annotation record 150 are described in greater detail below with reference to FIGS. 3 and 4.

Annotating Query Components

Figure 3A:
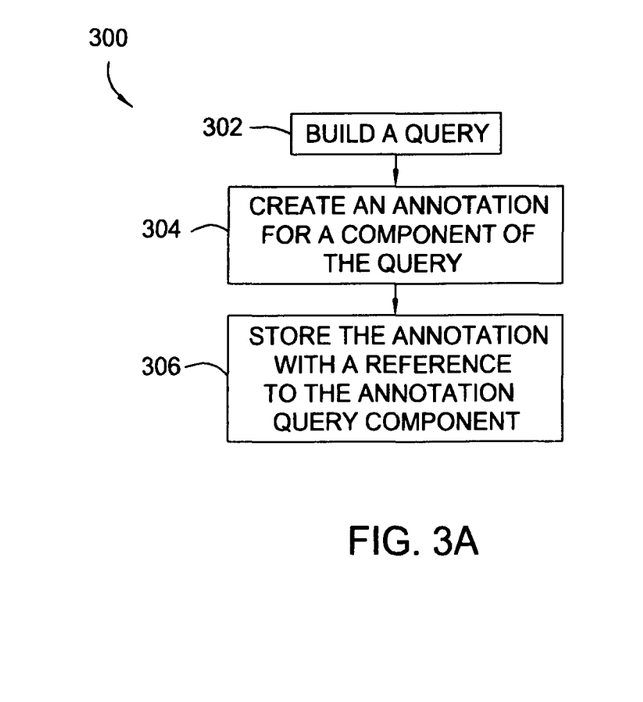
FIGS. 3A and 3B are flow charts illustrating exemplary operations for capturing and sharing annotations for query components according to one embodiment of the present invention.
Figure 3B:
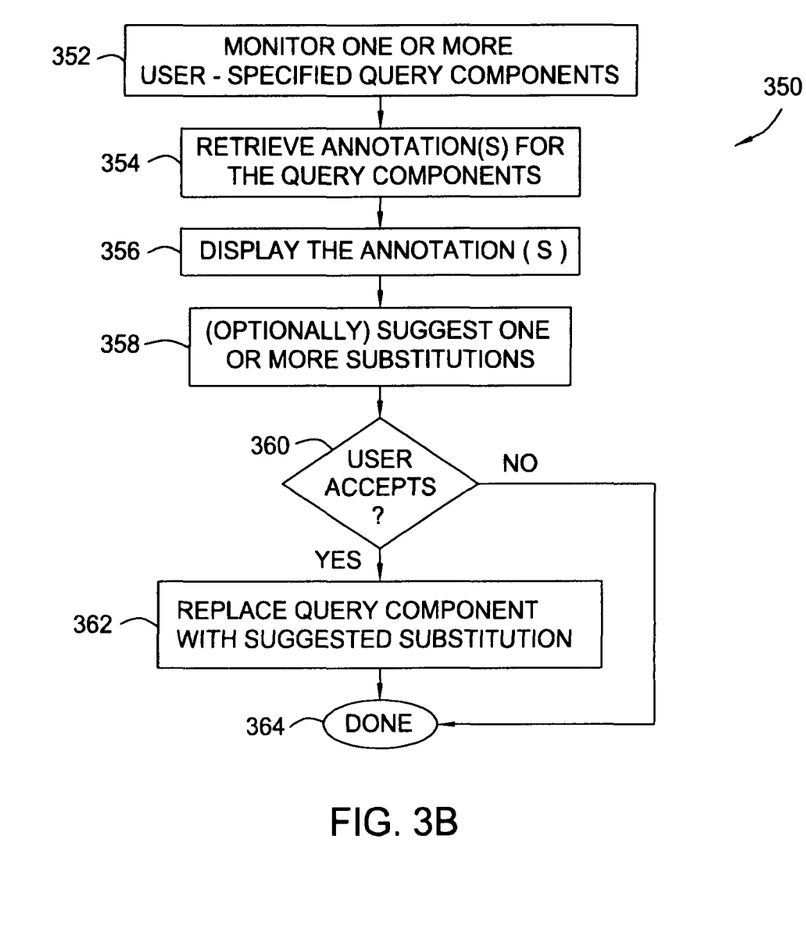

FIGS. 3A and 3B illustrate exemplary operations 300 and 350 for creating and viewing an annotation for a query component, respectively, that may be performed during query building sessions. For example, the operations 300 may be performed by a first user during a first query building session while the operations 350 may be performed by a second user during a second query building session. In any case, the operations 300 and 350 may be best described with reference to the exemplary graphical user interface (GUI) screens illustrated in FIGS. 4A-4D which may be provided, for example, as components of the query building interface 122 and annotation system 140.

Figure 4A:
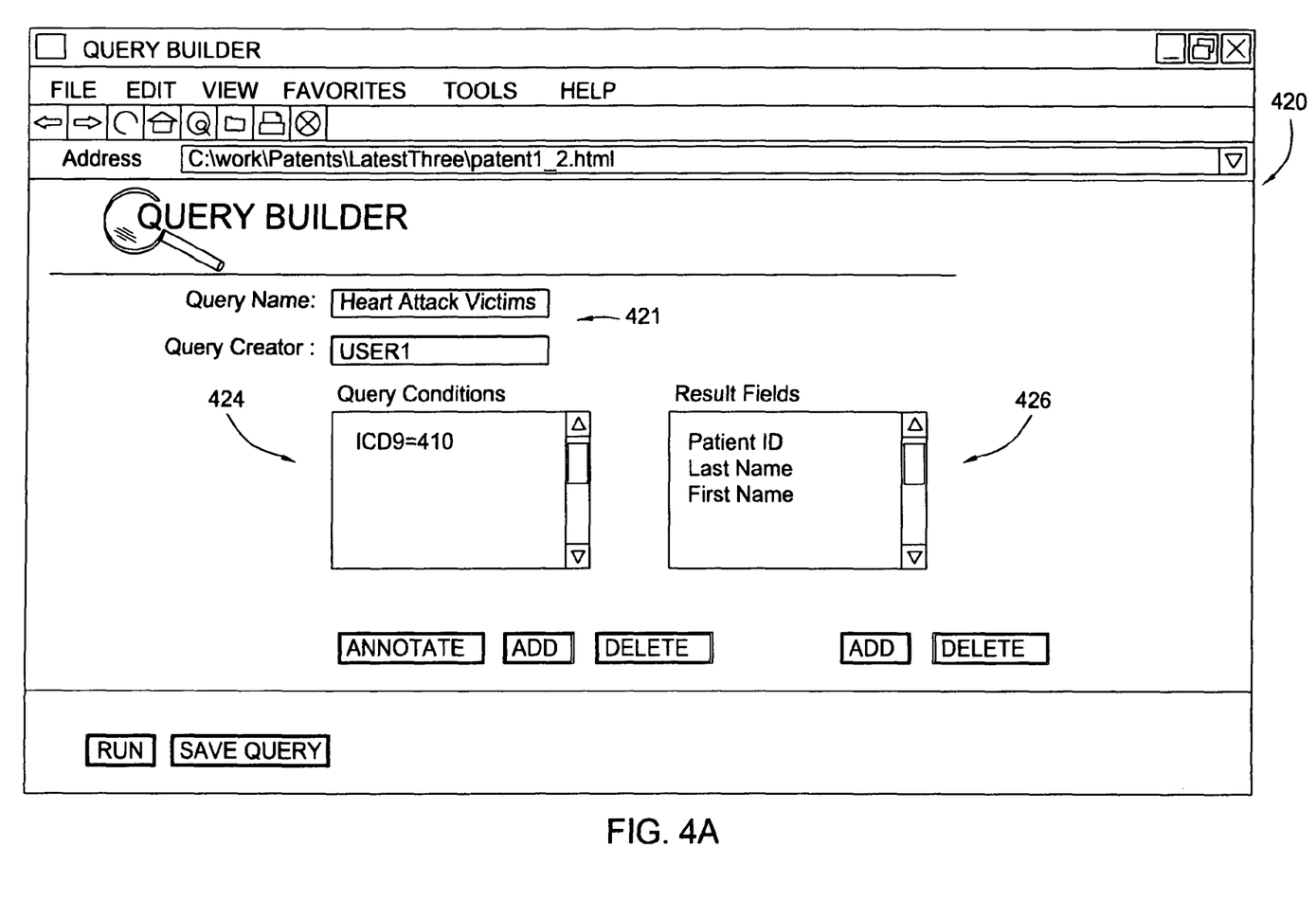
FIGS. 4A-4E illustrate exemplary graphical user interface (GUI) screens in accordance with one embodiment of the present invention.

The operations 300 begin, at step 302, by building a query. For example, a user may build a query by specifying one or more query conditions, via the GUI screen 420 of FIG. 4A. As illustrated, the user may add and delete query conditions, listed in a Query Conditions window 424, and results listed in a Results window 426. For some embodiments, the user may be able to choose previously-saved query components, for example, comprising one or more query conditions, as described in the commonly owned, co-pending U.S. patent application entitled "SQL Query Construction Using Durable Query Components," filed Oct. 3, 2002. In any case, as shown, the user may build a query to return a list of patients that have had heart attacks, by specifying the following query condition based on a governmental diagnostic (ICD9) code for heart attacks:

ICD9='410'.

However, upon execution, the query may not return all of the expected results. For example, after possibly lengthy investigation the user may realize that the ICD9 code for heart attacks had been changed from 412 to 410 and that the old code (412) may have been used for some patients.

At step 304, in an effort to share this information with subsequent users (e.g., performing similar research), the user may create an annotation for the query condition. For example, the user may select the query condition in the Query Condition window 424 and access (via an Annotate button) an annotation GUI screen 410 shown in FIG. 4B. As illustrated, the user may create a comment 414 that contains the pertinent information related to the selected query component. Further, the GUI screen 410 may also allow the user to create a suggested substitution (via button 419) that may be used to replace the annotated query component, for example, addressing common mistakes. In the illustrated example, the user may create a substitute query condition to target both the new and old ICD9 codes for heart attacks (e.g., ICD9=410 OR ICD9=412). The suggested substitution may be built using a similar query building GUI screen to that shown in FIG. 4A and may be presented to a subsequent user building a query with the annotated query component.

At step 306, the annotation is stored with a reference to the annotated query component. For example, an annotation record 150, as illustrated in FIG. 2C may be generated and stored in the annotation store. As previously described, the reference 152 to the annotated query component may comprise any suitable information to indicate the query component. As a simple example, in some cases, the reference may be an actual code portion of a query, such as the annotated query component itself ('ICD9=410'). For other cases, however, the query component may be broken down into simpler components. For example, an annotated query component may comprise a group of query conditions, which may be decomposed into fragments corresponding to the individual query conditions that may be stored in the annotation record. Further, a user may be able to select and create an annotation for a particular instance value (e.g., with a common misspelling) or a field (for example, to clarify exactly what data is contained in the field).

For some embodiments, a user may choose to replace a particular instance value in a query component with a parameter marker, effectively changing the scope of the annotation to refer to a particular field involved in the corresponding query components. As an example, a user may generate a query to return a list of customers for a particular city, containing the following query condition:

City='Rochester' which, upon execution, returns no results. Upon investigation, the user may learn that cities are stored in all capitals. Accordingly, a user may create an annotation for this query component indicating cities are stored in all upper case, as well as a suggested substitution (e.g., City='ROCHESTER').

Figure 4B:
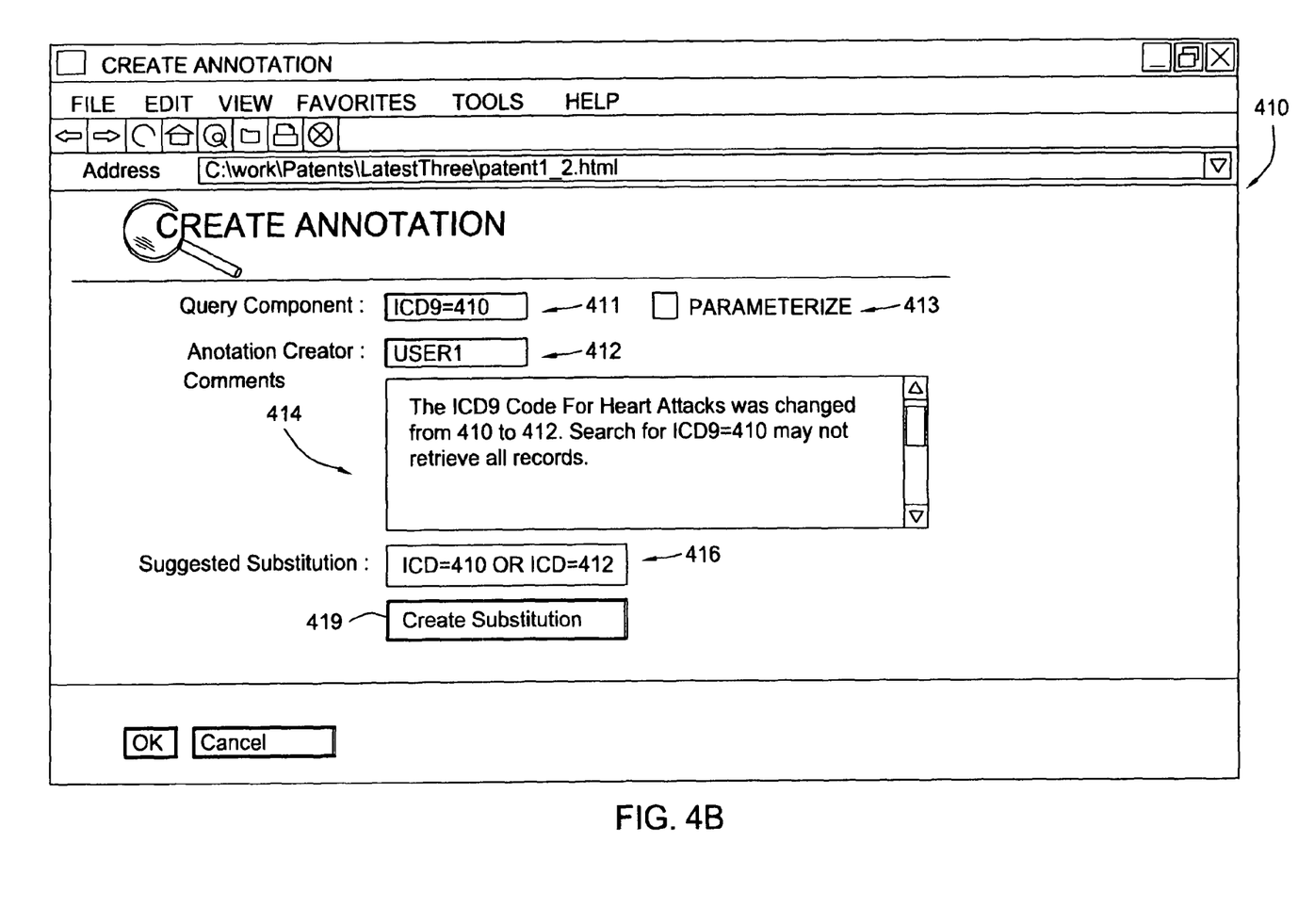

Of course, the same annotation would be useful, not only to this particularly query condition, but to any query condition involving the city field, regardless of the actual city. Rather than associate the annotation with a particular instance of the selected query component (with a reference to a specific city), the user may associate the annotation with any query condition involving the city field. This may be done, for example, by substituting a parameter marker for the particular instance value, resulting in the following condition:

City='?' indicating the annotation is associated with the field, regardless of the particular instance value provided. For some embodiments, whether or not parameter markers are substituted for particular values in a query component may be configurable by a user. For example, as illustrated in FIG. 4B, the user may simply select a Parameterize check box 413, when creating the annotation, causing a parameterized version of the query component to be stored as a reference. A suggested modification may also be provided with a parameter marker, such as:

City=UPPERCASE(?)

allowing a suggested modification to be automatically generated by substituting a particular instance value for the parameter marker.

Displaying Annotations for Query Components

As previously described, annotations created for query components may be useful to users subsequently attempting to build queries based on the annotated query components. In other words, the annotations may help guide the subsequent users during the query building process (e.g., to avoid common pitfalls, data peculiarities, etc.), to get the actual query results they desire. FIG. 3B, illustrates exemplary operations 350 that may be performed, during a query building process to retrieve and display annotations to a user.

Figure 4C:
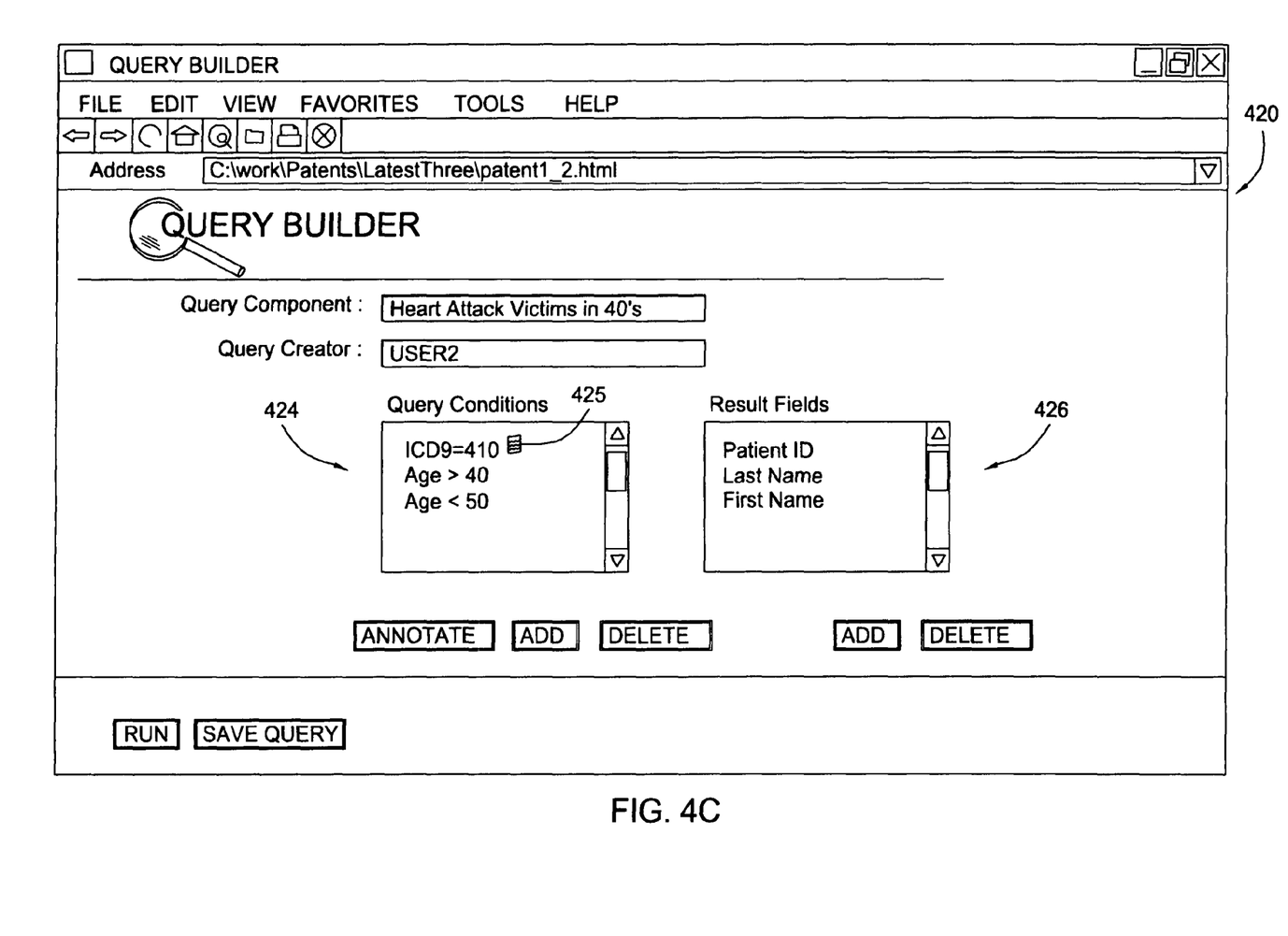

The operations 350 begin, at step 352, by monitoring one or more user-specified query components and, at step 354, annotations (if any) for the monitored query components that are retrieved. For example, as illustrated in FIG. 4C, a user may build a query to return a list of heart attack victims in their forties. During the query building process, query components (e.g., conditions, instance values, and/or fields in Conditions window 424, as well as results fields in window 426) may be monitored. For example, as new query components are added, annotation records may be searched for references to the newly added components, to determine if annotations exist for any of the specified query components. As previously described above, the types of references stored in the annotation records may vary and, therefore, the techniques used to search for annotations may vary as well.

For example, rather than search for annotations using direct text searching (e.g., to find an exact match with the specified query component), a search may be performed based on a logical meaning of the query component. In other words, a specified query component may be broken down into simpler parts and common logical rules may be applied. As an example, logical rules such as the following may be applied to find annotations for query components having the same logical meaning:

condX AND condY==condY AND condX, and (condX AND condY) OR condZ==condZ OR (condY AND condX).

Further, references to query components that contain parameter markers, as described above, will also be searched to find annotations associated with common fields, regardless of particular instance values provided.

Figure 4D:
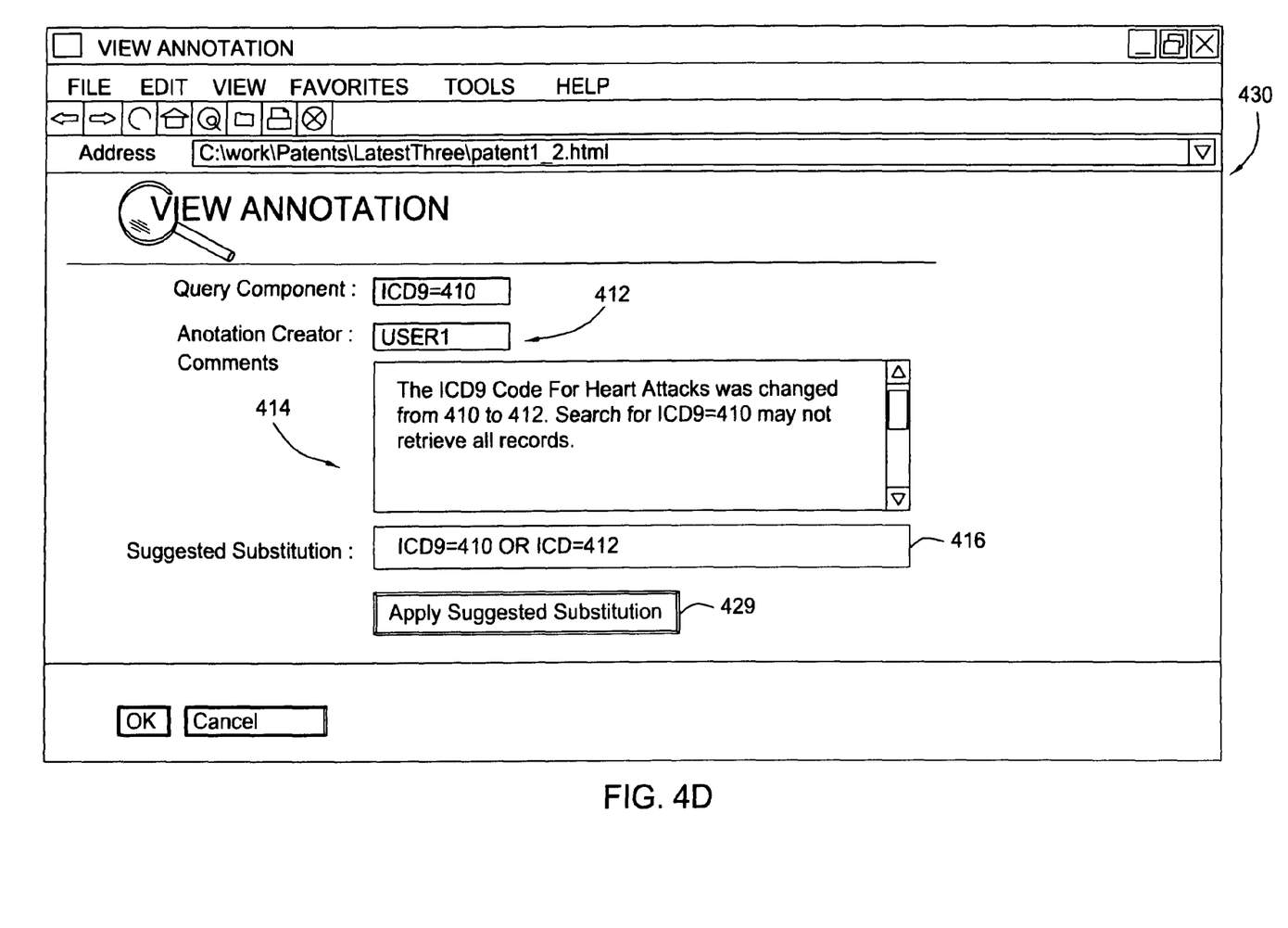

At step 356, annotations for the query components, or at least an indication of such, are displayed. For example, as shown in FIG. 4C, an annotation icon 425 may be displayed next to an annotated query component, indicating a corresponding annotation exists. In order to display the annotation, the user may select (e.g., click on) the annotation icon 425, resulting in the View Annotation GUI screen 430, shown in FIG. 4D, presenting the user with the annotation.

At step 358, one or more substitutions for the annotated query component are optionally suggested. For example, the suggested substitution 429 may be presented to the user, who may also be presented with the option to accept the suggested substitution 429. In some cases, the user may not accept the suggested substitution (e.g., the user may not want to retrieve heart attack victims that had an old ICD9 code).

Figure 4E:
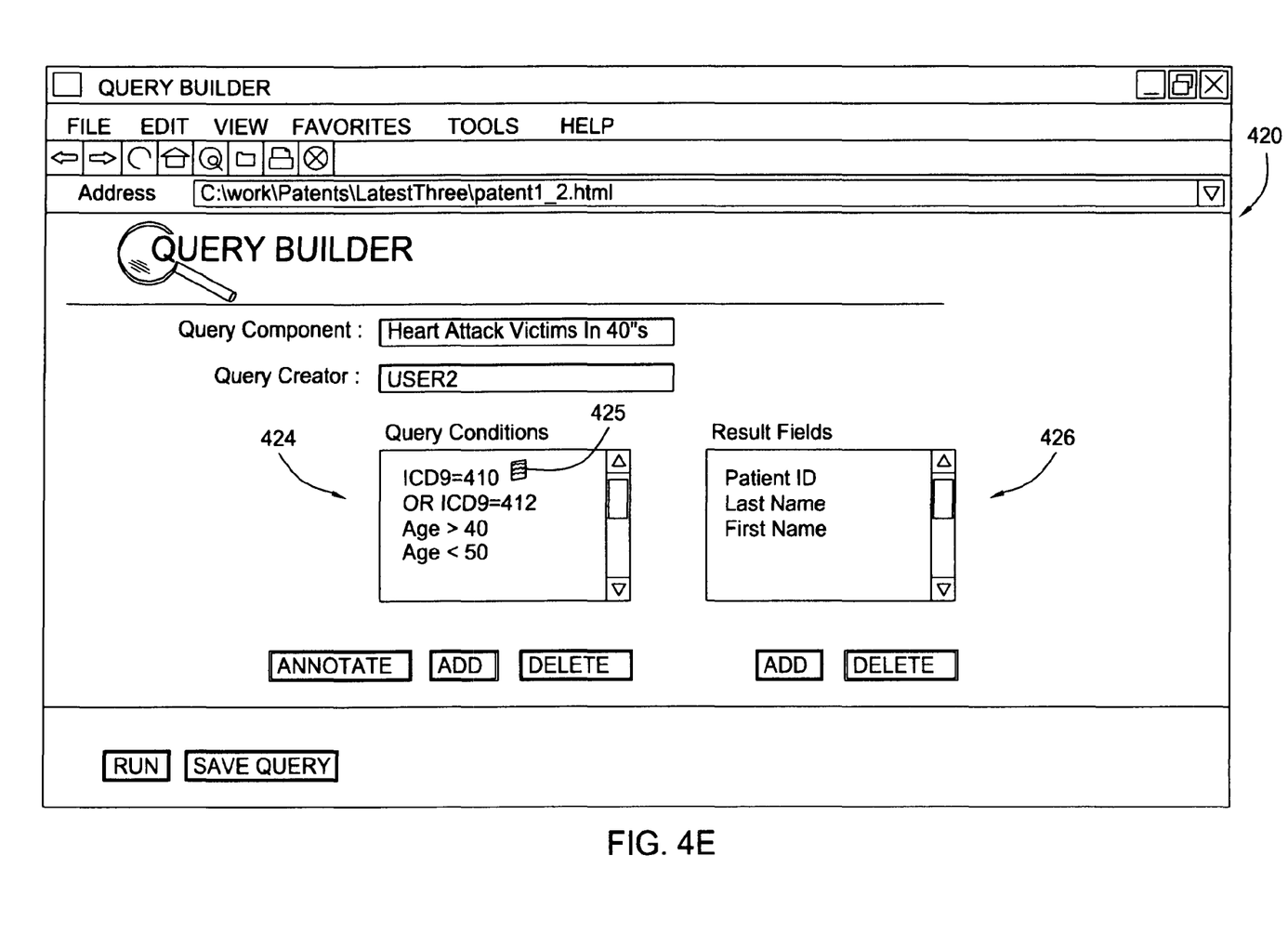

However, at step 360, if the user does accept, the annotated query component is replaced with the suggested substitution, at step 362. For example, the user may accept via an Apply Substitution button 429, resulting in modification of the query, as shown in FIG. 4E, to include the suggested substitution 429. For some cases, rather than present the user with a choice, a query may be modified automatically to include a suggested substitution (e.g., in a manner transparent to the user), for example, just prior to executing the query. In any case, the operations 350 are exited, at step 364, only to be possibly repeated, for example, as new query components are added.

CONCLUSION

By annotating query components, valuable domain knowledge may be shared that may facilitate the query building process. For example, annotations including information regarding a particular format, organization, or content of data targeted by a query condition may prevent a user from making a common mistake. In other words, without the information presented in the annotation, the user may generate a query that does not return complete query results desired.

While the foregoing is directed to embodiments of the present invention, other and further embodiments of the invention may be devised without departing from the basic scope thereof, and the scope thereof is determined by the claims that follow.

What is claimed is:

1. A computer implemented method, comprising:
   receiving a selection of a portion of a first query having a plurality of portions, wherein the first query comprises an abstract query posed against a database abstraction model for a physical database;
   annotating the selected portion of the first query by operation of one or more computer processors and responsive to receiving, via an interface: (i) an annotation for the selected portion of the first query and (ii) a request to annotate the selected portion of the first query with the annotation;
   receiving a suggested substitution for the annotated portion of the first query; and
   storing, on a storage medium, the annotation and the suggested substitution with a reference to the annotated portion of the first query, wherein the interface is configured to present the annotation in conjunction with the suggested substitution and a user interface element for a user composing a second query to request the annotated portion to be programmatically replaced with the suggested substitution in the second query, wherein storing the annotation with a reference to the portion of the first query comprises: substituting a parameter marker for a first instance value contained in the portion of the first query and storing the portion of the first query with the parameter marker with the annotation;
   wherein replacing the annotated portion with the suggested substitution comprises at least one of: substituting a second instance value for the parameter marker in the second query; replacing the annotated portion with user-specified query logic; and augmenting the annotated portion with user-specified query logic;
   wherein a search is performed to identify annotations pertaining to the second query, wherein the annotation is determined to pertain to the second query by at least one of: determining that the instance is identical to the annotated portion of the first query and determining, based on one or more predetermined matching rules, that the instance semantically matches the annotated portion of the first query; and wherein at least a second annotation is not determined to pertain to the second query.

2. The method of claim 1, wherein the selected portion of the first query comprises one or more query conditions.

3. The method of claim 1, wherein the selected portion of the first query comprises one or more instance values of data, where instance values are any particular value inputted in a field.

4. The method of claim 1, further comprising:
   providing an interface for building the first query by specifying query portions; and
   wherein receiving an indication of the selected portion of the first query comprises receiving a user selection of one or more query portions specified, via the interface, for use in the first query.

5. The method of claim 1, further comprising providing an interface for a user composing the first query to create the suggested substitution for the selected portion of the first query.

6. The method of claim 1,
   wherein the second query includes an instance of the annotated portion,
   wherein the second instance value is different from the first instance value, wherein the second query is different from the first query, and wherein the selection of the portion of the first query is received from a user composing the first query, and wherein the user composing the first query is different from the user composing the second query.

7. The method of claim 1, wherein the first query comprises a database query.

8. The method of claim 1, wherein the selected portion of the first query comprises at least one of a query condition, an instance value in the query condition, a specified result field, and a specified formatting of the result field.

9. The method of claim 1, wherein the database abstraction model defines a plurality of logical fields that each define: a logical field name, an access method, and a location in the physical database for accessing respective data elements in the physical database.

10. The method of claim 9, wherein the access method is selected from at least two different access method types, wherein each different access method type defines a different manner of exposing specified data retrieved from a physical data field.

11. A computer-readable storage medium containing a program which, when executed by a processor, performs operations comprising:
    receiving a selection of a portion of a first query having a plurality of portions, wherein the query comprises an abstract query posed against a database abstraction model for a physical database;
    by operation of one or more computer processors when executing the program, annotating the selected portion of the first query responsive to receiving, via an interface: (i) an annotation for the selected portion of the first query and (ii) a request to annotate the selected portion of the first query with the annotation;
    receiving a suggested substitution for the annotated portion of the first query; and storing, on a storage device, the annotation and the suggested substitution with a reference to the annotated portion of the first query, wherein the interface is configured to present the annotation in conjunction with the suggested substitution and a user interface element for a user composing a second query to request the annotated portion to be programmatically replaced with the suggested substitution in the second query, wherein storing the annotation with a reference to the portion of the first query comprises: substituting a parameter marker for a first instance value contained in the portion of the first query and storing the portion of the first query with the parameter marker with the annotation;

wherein replacing the annotated portion with the suggested substitution comprises at least one of: substituting a second instance value for the parameter marker in the second query; replacing the annotated portion with user-specified query logic; and augmenting the annotated portion with user-specified query logic;

wherein a search is performed to identify annotations pertaining to the second query, wherein the annotation is determined to pertain to the second query by at least one of: determining that the instance is identical to the annotated portion of the first query and determining, based on one or more predetermined matching rules, that the instance semantically matches the annotated portion of the first query; and wherein at least a second annotation is not determined to pertain to the second query.

12. The computer-readable medium of claim 11, wherein the operations further comprise providing an interface for a user composing the first query to create the suggested substitution for the selected portion of the first query.

13. The computer-readable medium of claim 11,
wherein the second query includes an instance of the annotated portion,
wherein the second instance value is different from the first instance value, wherein the second query is different from the first query, and wherein the selection of the portion of the first query is received from a user composing the first query, and wherein the user composing the first query is different from the user composing the second query.

14. The computer-readable medium of claim 11, wherein the operations further comprise:
monitoring one or more query portions specified for use in the second query;
searching for annotations associated with the one or more query portions; and
providing an indication of one or more annotations, if found, associated with the one or more query portions.

15. The computer-readable medium of claim 11, wherein the first query comprises a database query.

16. The computer-readable medium of claim 11, wherein the selected portion of the first query comprises at least one of a query condition, an instance value in the query condition, a specified result field, and a specified formatting of the result field.

17. The computer-readable medium of claim 11, wherein the database abstraction model defines a plurality of logical fields that each define: a logical field name, an access method, and a location in the physical database for accessing respective data elements in the physical database.

18. The computer-readable medium of claim 17, wherein the access method is selected from at least two different access method types, wherein each different access method type defines a different manner of exposing specified data retrieved from a physical data field.

19. A computer implemented method, comprising:
receiving a selection of a portion of a first query having a plurality of portions, wherein the first query comprises an abstract query posed against a database abstraction model for a physical database;
providing an interface for a user composing the first query to create an annotation and request to annotate the selected portion of the first query with the annotation;
receiving, from the user composing the first query, a suggested substitution for the annotated portion of the first query;
by operation of one or more computer processors, annotating the selected portion of the first query with the annotation by storing, on a storage medium, the annotation with a reference to the selected portion of the first query, wherein storing the annotation with a reference to the portion of the first query comprises: (i) substituting a parameter marker for a first instance value contained in the portion of the first query and (ii) storing the portion of the first query with the parameter marker with the annotation;
associating the suggested substitution with the annotated portion of the first query, wherein the interface is configured to present the annotation in conjunction with the suggested substitution and a user interface element for a second user composing a second query to request the annotated portion to be programmatically replaced with the suggested substitution in the second query;
monitoring one or more query portions specified for use in the second query;
searching for stored annotations associated with the one or more query portions, wherein the annotation is determined to be associated with the second query by at least one of: determining that the instance is identical to the annotated portion of the first query and determining, based on one or more predetermined matching rules, that the instance semantically matches the annotated portion of the first query; and
outputting an indication of one or more annotations found to be associated with the one or more query portions;
wherein replacing the annotated portion with the suggested substitution comprises at least one of: substituting a second instance value for the parameter marker in the second query; replacing the annotated portion with user-specified query logic; and augmenting the annotated portion with user-specified query logic; and wherein at least a second annotation is not determined to pertain to the second query.

20. The method of claim 19, wherein the first query comprises a database query.

21. The method of claim 19, wherein the selected portion of the first query comprises at least one of a query condition, an instance value in the query condition, a specified result field, and a specified formatting of the result field.

22. The method of claim 19, wherein the database abstraction model defines a plurality of logical fields that each define: a logical field name, an access method, and a location in the physical database for accessing respective data elements in the physical database.

23. The method of claim 22, wherein the access method is selected from at least two different access method types, wherein each different access method type defines a different manner of exposing specified data retrieved from a physical data field.

* * * * *